(12) United States Patent
Aumer et al.

(10) Patent No.: US 6,970,950 B2
(45) Date of Patent: Nov. 29, 2005

(54) METHOD FOR OPERATING A MODULAR CONTROL SYSTEM AND CONTROL SYSTEM THEREFOR

(75) Inventors: Albert Aumer, Ammerthal (DE); Domagoj Ilic, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 10/687,915

(22) Filed: Oct. 20, 2003

(65) Prior Publication Data

US 2004/0158653 A1    Aug. 12, 2004

Related U.S. Application Data

(63) Continuation of application No. PCT/DE02/01456, filed on Apr. 19, 2002.

(30) Foreign Application Priority Data

Apr. 20, 2001   (DE) ............................... 101 19 622

(51) Int. Cl.$^7$ ............................................. G06F 3/00
(52) U.S. Cl. ............................................. 710/9; 710/10
(58) Field of Search ................... 710/9, 8, 10

(56) References Cited

U.S. PATENT DOCUMENTS

| | | | |
|---|---|---|---|
| 5,675,830 A | 10/1997 | Satula | ........................... 710/9 |
| 6,216,172 B1 * | 4/2001 | Kolblin et al. | .............. 709/253 |
| 6,456,743 B1 * | 9/2002 | Charrier et al. | ............. 382/248 |
| 6,510,461 B1 * | 1/2003 | Nielsen | ..................... 709/224 |
| 2004/0193918 A1 * | 9/2004 | Green et al. | ................. 713/201 |

FOREIGN PATENT DOCUMENTS

| | | |
|---|---|---|
| DE | 36 40 670 A1 | 6/1988 |
| DE | 196 18 821 A1 | 11/1997 |
| DE | 197 13 240 A1 | 10/1998 |
| DE | 197 33 906 A1 | 2/1999 |
| WO | WO 01/15385 A2 | 3/2001 |

\* cited by examiner

*Primary Examiner*—Kim Huynh
*Assistant Examiner*—Harold Kim
(74) *Attorney, Agent, or Firm*—Sughrue Mion, PLLC

(57) ABSTRACT

In order to operate a modular control system that has a central processor (Z) and a plurality of peripheral modules (Bn) connected thereto, the inputs (In) and outputs (Qn) of the central processor (Z) and of each of the peripheral modules (Bn) are successively entered, without any gaps, into a process image (PA) during an initialization phase.

5 Claims, 1 Drawing Sheet

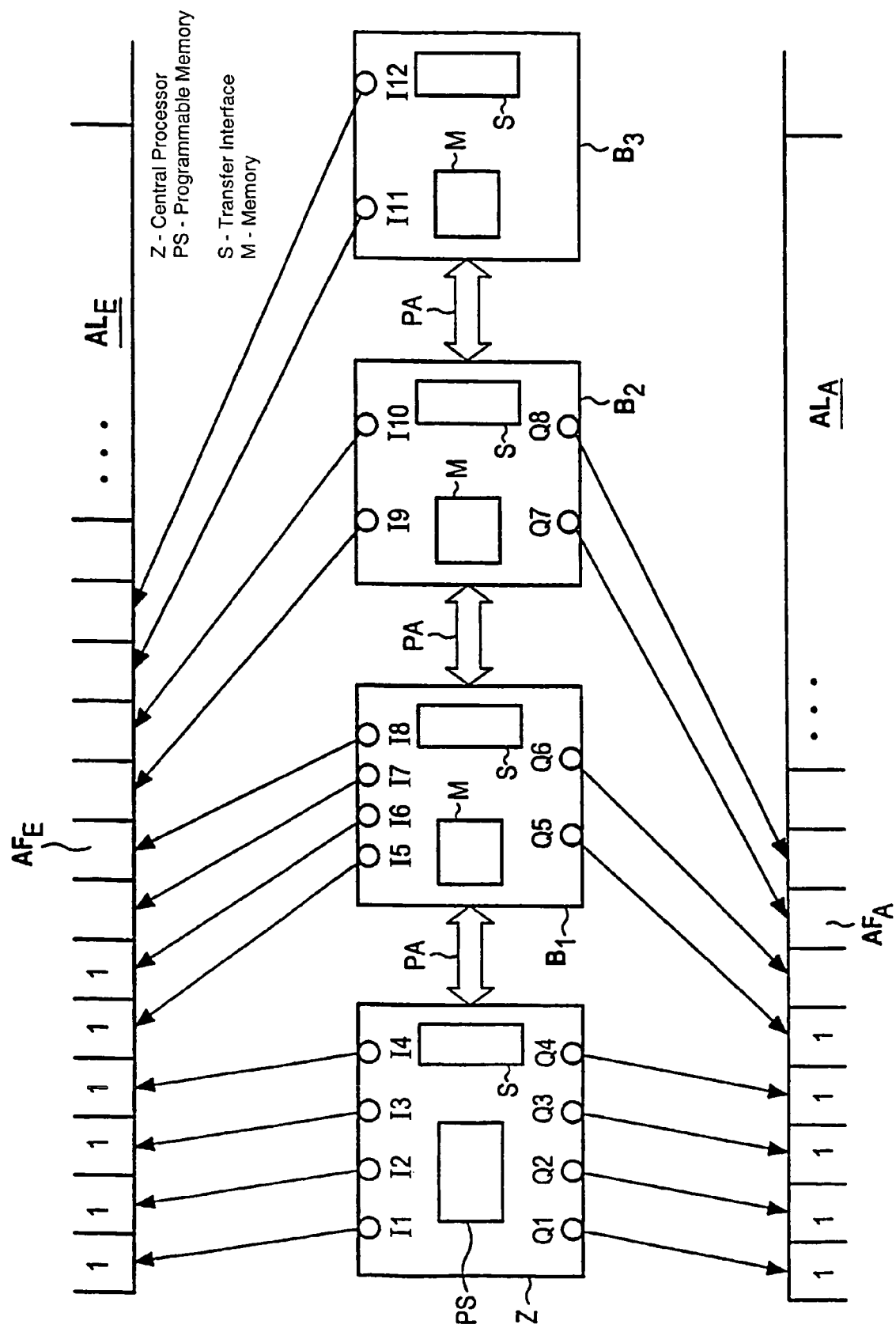

METHOD FOR OPERATING A MODULAR CONTROL SYSTEM AND CONTROL SYSTEM THEREFOR

This is a Continuation of International Application PCT/DE02/01456, with an international filing date of Apr. 19, 2002, which was published under PCT Article 21(2) in German, and the disclosure of which is incorporated into this application by reference.

FIELD OF AND BACKGROUND OF THE INVENTION

The invention relates to a method for operating a modular control system that has a central processor and a plurality of peripheral modules connected thereto. The invention further relates to a control system the employs such a method.

Such a modular control system is used to control installation parts that operate within an automated and frequently complex technical process. For this purpose, a central processor (master) and a plurality of so-called peripheral modules (slaves), such as actuators, sensors or general transducers, are provided, which are interconnected via a bus system or via point-to-point connections. These modules, which, as a rule, also act as (interface-) slaves, exchange process signals and status or control information with higher-level control tasks or functions within the networked control system.

To determine the physical arrangement of the individual modules within the (stored-program) control or automation system, a so-called slot with a fixed address is assigned to the central processor and to each module. The respective slot address depends on the respective number of the slot. The central processor and each of the modules are uniquely defined by this slot address.

In addition to the slot address, which defines a respective slot, each module has a start address which defines its location in the logic address space. This start address is determinant for the addressing of the inputs and outputs of the respective module by a higher-level application program, which is usually stored in the central processor. To read specific inputs or to write to outputs, the application program must access the addresses predefined by the system.

Based on this fixed slot and addressing scheme, the respective module always occupies the full address range of an allocated slot, irrespective of whether or not the full address range is actually used. As a result, address space is wasted because a slot with a specific number of inputs and/or outputs is actually occupied by a module that has a smaller number of inputs and/or outputs. This creates "gaps" within the address list of the process image stored, in particular, in the central processor and thus within the process image itself. The process image must always take into account the maximum number of occupiable inputs and outputs of the total system, which is based on the existing slots. The "gaps" occur when individual modules occupy fewer inputs and/or outputs than the number assigned to the respective slots. This makes it necessary to set aside memory space that is regularly unused at least by the central processor. This is ineffective and thus extremely undesirable because of the complexity and costs connected therewith.

This kind of assignment of slot numbers and slot addresses, and this kind of assignment of the start addresses that are determinant for the addressing of the inputs and outputs of the individual modules is not only extremely complex, especially during startup or initialization of such a modular control system, but also requires a precise knowledge of the entire system. For example, during startup, the given slot rules must be complied with in a manner specific to the system and, where applicable, hardware configurations must be performed. This makes the overall system very inflexible. Alternatively, in addition to generating the program, a time-consuming hardware configuration must be performed.

OBJECTS OF THE INVENTION

It is one object of the invention to provide a suitable method for operating a modular control system, which, in particular, allows for starting up the entire system in a simple manner. A further object of the invention is to provide a particularly suitable control system for this purpose.

SUMMARY OF THE INVENTION

According to one formulation of the invention, these and other objects of the invention are achieved by a method for operating a modular control system that has a central processor and a plurality of peripheral modules connected therewith, wherein, during an initialization phase of the central processor, the inputs and/or the outputs of the central processor and each of the peripheral modules are successively entered, without gaps, into a process image.

In one advantageous embodiment, the central processor first stores the inputs and/or outputs occupied by the central processor in the process image. This is advantageously accomplished by setting or occupying a number of addresses or address fields, which corresponds to the number of the inputs and/or outputs, within an input and/or output list of the process image. Subsequently, the central processor transfers this process image to the neighboring peripheral module, which then stores its inputs and/or outputs in this process image. This peripheral module does this by occupying the address list with its inputs and/or outputs, without any gaps. This peripheral module transfers the process image, which is now expanded, without any gaps, by its inputs and/or outputs, to its neighboring peripheral module, which in turn expands the transferred process image by its own module-specific inputs and/or outputs.

This process is continued until all the modules have entered their I/O configuration into the process image. Each module detects the respectively occupied I/Os, i.e., the respectively occupied inputs and/or outputs, and successively expands, starting from the first free address space and without any gaps, the address list transferred with the process image. For this purpose, an input-specific and an output-specific address list may exist within one common process image. Alternatively, there may be an input-specific and an output-specific process image.

According to another formulation of the invention, these and other objects are achieved by a control system that has at least one central processor with a programmable memory and a transfer interface via which the central processor communicates with a neighboring peripheral module. The peripheral module, or each peripheral module, in turn has a programmable memory and a transfer interface via which a process image received by this module is transferred to a neighboring module. The process image is transferred after the respective module has entered, without any gaps, its inputs and/or outputs into the received process image, adjacent to the already occupied address fields within the address list.

It is an advantage of the invention that this gap-less address assignment within the process image of a modular control system, which includes a central processor and a plurality of peripheral devices, does not require any slot schemes or fixed addressing schemes. As a result, detailed knowledge of the system is no longer required and no hardware configuration needs to be performed. In addition, peripheral addresses can no longer be lost.

Furthermore, modules with a different I/O configuration that have to be added to an existing system can be inserted without repercussions.

BRIEF DESCRIPTION OF THE DRAWINGS

The invention will now be described, by way of example, with reference to an embodiment depicted in the drawing. The single FIGURE schematically depicts a function block diagram, which shows the address assignment of a plurality of modules of a modular control system.

DETAILED DESCRIPTION OF THE PREFERRED EMBODIMENTS

The modular control system includes a central processor or master Z and, in this exemplary embodiment, three peripheral modules $B_1$ to $B_3$. The central processor Z, e.g., a CPU, has a programmable memory PS and a transfer interface S. Analogously, each of the modules $B_1$ to $B_3$ has a transfer interface S and a memory M, which is preferably also programmable.

The modules $B_1$ to $B_3$ can be communications modules, peripheral modules and/or modules with intelligent preprocessing capabilities for processing actuator or sensor signals of a technical process within an automation system.

When the control system is started up, the central processor Z stores its inputs I1 to I4 in a process image PA of the inputs, hereinafter referred to as the input address list $AL_E$. The central processor Z further stores its outputs Q1 to Q4 in a process image PA of the outputs, hereinafter referred to as output address list $AL_A$. In the input address list $AL_E$, this allocation is illustrated by the entry of a "1" in the respective address fields $AF_E$ for the inputs I1 to I4. Analogously, in respective address fields $AF_A$ of the output address list $AL_A$, a "1" is entered in each of the first four address fields $AF_A$.

The first connected peripheral module, i.e., the module $B_1$, which in the example is connected directly to the central processor Z, then occupies with its inputs I5 to I8 the next four address spaces $AF_E$ within the input address list $AL_E$. Analogously, this first module $B_1$, with its two outputs Q5 and Q6 occupies the next two free address spaces $AF_A$ within the output address list $AL_A$. Thus, the respectively free address spaces $AF_E$ and $AF_A$ of the process image PA defined by the address lists $AL_E$ and $AL_A$ are occupied without any gaps from left to right—as shown in the drawing.

Analogously, the next connected module, i.e., the module $B_2$, which, in the exemplary embodiment, is connected to the first module B1, occupies with its inputs I9 and I10 and with its outputs Q7 and Q8 the next free address spaces $AF_E$ and $AF_A$ in the address lists $AL_E$ and $AL_A$, respectively. The third connected module, i.e., the module $B_3$, which, in the exemplary embodiment, is connected to the second module $B_2$, in turn occupies with its inputs I11 and I12 the next free address spaces $AF_E$ within the input address list $AL_E$. Since this module $B_3$ does not have any outputs, module $B_3$ does not occupy any spaces in the output address list $AL_A$.

The occupation of the inputs and outputs In in the process image PA occur during the initialization phase, which the central processor Z automatically starts after the modules $B_1$ to $B_3$ have been started up. The central processor Z enters its inputs I1 to I4 and its outputs Q1 to Q4 into the process image PA and transfers this process image to the first module $B_1$. This module $B_1$ detects the occupied address spaces $AF_E$ and $AF_A$ and thus the already occupied I/Os, and in turn enters its I/Os, i.e., its inputs I5 to I8 and its outputs Q5 and Q6 into the process image PA. The first module $B_1$ then transfers the thus expanded process image PA to the next module $B_2$, which in turn enters its I/Os, i.e., its inputs I9 and I10 and its outputs Q7 and Q8 into the process image PA and transfers the process image PA to the third module $B_3$. This process is continued until all of the modules $B_1$ to $B_n$ have entered their I/O configuration into the process image PA.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for operating a modular control system having a central processor equipped with at least one of central processor inputs and central processor outputs and having a plurality of peripheral modules connected to the central processor equipped with at least one of respective peripheral module inputs and respective peripheral module outputs, wherein, during an initialization phase of the modular control system, the method comprises:

the central processor entering, without any gaps, the at least one of the central processor inputs and central processor outputs into a process image;

the central processor transferring the process image to an adjacent one of the peripheral modules;

each of the peripheral modules entering, without any gaps, the at least one of the respective peripheral module inputs and the respective peripheral module outputs into the process image; and each of the peripheral modules delivering the process image to a respective neighboring one of the peripheral modules.

2. The method as claimed in claim 1, wherein the central processor inputs and the respective peripheral module inputs are entered into an input-specific address list of the process image.

3. The method as claimed in claim 1, wherein the central processor outputs and the respective peripheral module outputs are entered into an output-specific address list of the process image.

4. A method, comprising:

without any gaps, sequentially entering at least one of input values and output values of a central processor and peripheral modules connected to the central processor into a representation of a process that is performed by the central processor and the peripheral modules;

wherein, in-between and in accordance with the sequential entering of the at least one of input values and output values:

(a) the representation of the process is transferred from the central processor to a first one of peripheral modules, which is arranged adjacent to the central processor;

(b) subsequently, the representation of the process is transferred from the first one of the peripheral modules to a second one of the peripheral modules, which is arranged adjacent to the first one of the peripheral modules; and (c) subsequently, the representation of the process is transferred from the second one of the peripheral modules to a third one of the peripheral modules, which is arranged adjacent to the second one of the peripheral modules.

5. A modular control system, comprising:

a stored-program central processor, the central processor having a central processor transfer interface and at least one of central processor inputs and central processor outputs; and a plurality of peripheral modules connected to the stored-program processor, each peripheral module having a respective peripheral module transfer interface and at least one of respective peripheral module inputs and respective peripheral module outputs;

wherein the central processor is configured to enter, without any gaps, the at least one of the central processor inputs and central processor outputs into the process image;

wherein the central processor transfer interface is configured to transfer the process image to an adjacent one of the peripheral modules;

wherein each of the peripheral modules is configured to enter, without any gaps, the at least one of the respective peripheral module inputs and respective peripheral module outputs into the process image; and wherein the respective peripheral module transfer interface is configured to deliver the process image to a respective neighboring one of the peripheral modules.

* * * * *